United States Patent
Doyle

(10) Patent No.: US 8,874,088 B2
(45) Date of Patent: *Oct. 28, 2014

(54) METHOD AND APPARATUS TO INDICATE COMMUNICATION IS WANTED OR WAITING

(75) Inventor: Thomas F. Doyle, San Diego, CA (US)

(73) Assignee: Omnitracs, LLC, San Diego, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 12/912,488

(22) Filed: Oct. 26, 2010

(65) Prior Publication Data

US 2011/0039525 A1 Feb. 17, 2011

Related U.S. Application Data

(63) Continuation of application No. 11/345,809, filed on Feb. 1, 2006, now Pat. No. 7,844,258.

(51) Int. Cl.
*H04M 3/42* (2006.01)
*H04W 68/00* (2009.01)
*H04W 68/12* (2009.01)

(52) U.S. Cl.
CPC .............. *H04W 68/00* (2013.01); *H04W 68/12* (2013.01)
USPC ..... 455/414.1; 455/11.1; 455/13.1; 455/41.2; 455/41.3; 455/404.2; 455/456.1; 455/456.2; 455/456.3; 455/456.5; 455/456.6; 455/457; 370/310.2; 370/328; 370/338

(58) Field of Classification Search
USPC .................. 455/11.1, 13.1, 41.2, 41.3, 404.2, 455/414.1, 456.1–456.6, 457; 370/310.2, 370/328, 338
See application file for complete search history.

(56) References Cited

U.S. PATENT DOCUMENTS

| | | | |
|---|---|---|---|
| 4,083,003 A | | 4/1978 | Haemmig |
| 4,606,073 A | * | 8/1986 | Moore .......................... 455/90.1 |
| 5,155,689 A | * | 10/1992 | Wortham .................... 455/456.3 |
| 5,838,237 A | | 11/1998 | Revell et al. |
| 5,898,679 A | | 4/1999 | Brederveld et al. |
| 5,905,433 A | | 5/1999 | Wortham |
| 6,131,019 A | | 10/2000 | King |
| 6,449,472 B1 | | 9/2002 | Dixit et al. |
| 6,687,609 B2 | | 2/2004 | Hsiao et al. |
| 6,925,308 B2 | | 8/2005 | Goldsmith et al. |
| 6,968,153 B1 | | 11/2005 | Heinonen et al. |
| 7,149,530 B1 | | 12/2006 | Arakawa et al. |
| 7,194,259 B2 | | 3/2007 | DeLine |

(Continued)

FOREIGN PATENT DOCUMENTS

| | | | |
|---|---|---|---|
| WO | 9526113 A | | 9/1995 |
| WO | WO 95/26113 | * | 9/1995 |

OTHER PUBLICATIONS

International Search Report and Written Opinion—PCT/US2007/061497—ISA/EPO—Jul. 18, 2007.

*Primary Examiner* — Steve D Agosta
(74) *Attorney, Agent, or Firm* — Arent Fox LLP

(57) ABSTRACT

An integrated communication system comprises a first communication device connected to a second communication device using a data link. When the first communication device is out of network, a dispatch center can indicate to the use a communication is waiting or wanted by sending a communication request signal to the second communication device. The second communication device transmits the communication request signal to the first communication device over the data link alerting the user of the first communication device to the requested communication.

21 Claims, 4 Drawing Sheets

(56) References Cited

U.S. PATENT DOCUMENTS

| | | |
|---|---|---|
| 7,202,801 B2 | 4/2007 | Chou |
| 7,307,514 B2 | 12/2007 | McAden |
| 2002/0024940 A1* | 2/2002 | Smith .......................... 370/329 |
| 2002/0115455 A1* | 8/2002 | Umstetter et al. ............ 455/462 |
| 2004/0260470 A1 | 12/2004 | Rast |
| 2006/0121951 A1 | 6/2006 | Perdomo et al. |

* cited by examiner

METHOD AND APPARATUS TO INDICATE COMMUNICATION IS WANTED OR WAITING

CLAIM OF PRIORITY UNDER 35 U.S.C. §120

The present Application for Patent is a Continuation Application, and claims priority to patent application Ser. No. 11/345,809 entitled "Method and Apparatus to Indicate Communication is Wanted or Waiting" filed Feb. 1, 2006, now allowed and assigned to the assignee hereof and hereby expressly incorporated by reference herein.

BACKGROUND

1. Field

Disclosed are methods and apparatuses relating to mobile communication systems to indicate communication is wanted or waiting between a dispatcher or party and a user of a communication device that is not receiving signals from the wireless communication network.

2. Relevant Background

Today's truck and delivery vehicles often include wireless devices in the truck cab to allow dispatchers and drivers to contact each other. Typically, the driver's wireless device transmits voice, text, and other data. Thus, the wireless device provides access to numerous applications, such as, for example, dispatch calls, text messaging, emails, voice mails, or the like.

Using the above system, dispatchers can, for example, contact the driver to alter the route to pick up a new load. In this case, the dispatcher may transmit voice or text data over the wireless network to the driver. The driver would receive the message and respond with an affirmation of the order, or potentially a denial. Often the driver and the dispatcher would send and receive messages in the same manner, but not necessarily. For example, it a voice connection is established by the dispatcher, the driver would typically respond over the voice connection. Similarly, if the drive sends a data transmission, such as an email, to the dispatcher, the dispatcher would typically respond by a return data transmission. The OMNIEXPRESS® device from QUALCOMM Incorporated is a device that provides, among other things, voice, text, and other data communications between the driver and the dispatcher, although other devices are usable as well.

While the above described system and devices generally work well, sometimes the driver is traveling or stationary in an area where the cab mounted unit, such as the OMNITRACS® devices and OMNIEXPRESS® devices mentioned above, are outside the corresponding wireless communication network. For example, a cross country driver may be driving where wireless towers do not readily exist or in mountain passes where the signals are blocked. In these instances, the dispatcher and the driver cannot contact each other.

Thus, it would be desirous to develop a communication system whereby the dispatcher could alert the drive of the need to communication when the truck cab wireless device is out of network.

SUMMARY

A system to alert a user that a communication is waiting or wanted is provided. The system includes a first wireless communication device having a display indicator and at least a second wireless communication device. A data link exists between the first and second wireless communication devices. A dispatch center is connected to the first wireless communication device via a first network and the second communication device via a second network. When the first wireless communication device is outside of the first wireless communication network, the dispatcher can alert the user of the first wireless communication device that the communication is waiting or wanted by causing the second wireless communication device to send a signal to the first wireless communication device causing the display indicator to indicate communication is desired.

Also provided is a method for alerting a user of a first wireless communication device that a dispatcher wishes to communication with the user. The method comprises sending a communication request to a second wireless communication device. The second wireless communication device receives the request and generates a display signal. The display signal is transmitted to a first wireless communication device over a data link between the second wireless communication device and the first wireless communication device. The first wireless communication device receives the display signal that causes a display indicator on the first wireless communication device to indicate dispatch wishes to communicate.

DETAILED DESCRIPTION

While the below description generally describes trucks having cabs and trailers, one of ordinary skill in the art on reading the disclosure would now recognize that the presently described method, apparatus, and system may be used in multiple environments. Other examples, include, for example, trains, boats, taxi cabs, cars, people, and the like.

Figure 1:
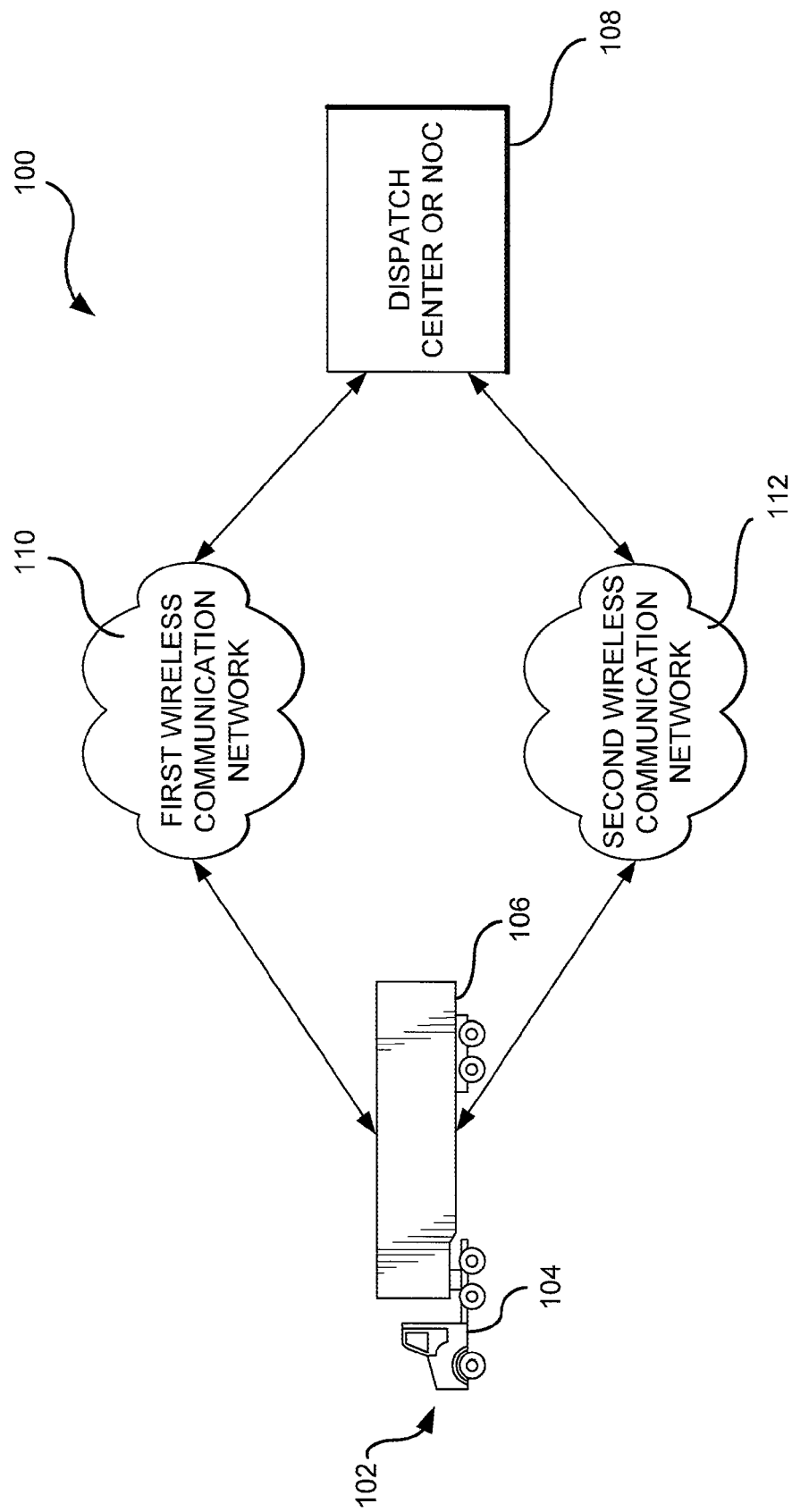
FIG. 1 is a block diagram of a system.

Referring first to FIG. 1, a system 100 is shown. System 100 includes a vehicle 102, which in this case, vehicle 102 comprises a truck cab 104 and a truck trailer 106, a dispatch center 108, which also may be referred to as a network operations center or NOC, a first wireless communication network 110, and a second wireless communication network 112. First wireless communication network and second wireless communication network 112 can be different types of networks, such as, for example, GPS and cellular networks or different modes of communication, such as, for example, digital and analog cellular networks. First wireless communication network 110 and second wireless communication network 112 should be construed broadly to encompass any type of wireless network and any specific examples should be considered non-limiting. First wireless communication network 110 and second wireless communication network 112 both connect vehicle 102 to dispatch center 108.

First wireless communication network 110 and second wireless communication network 112 are shown as completely separate for convenience, but first wireless communication network 110 and second wireless communication may overlap or, for example, first wireless communication network 110 may be encompassed by second wireless communication network 112. In some instances, first wireless communication network 110 and second wireless communication network 112 may be the same. First wireless communication network 110 and second wireless communication network 112 may be a terrestrial network, a satellite network, or a combination thereof. Moreover, first wireless communication network 110 and second wireless communication network 112 may be analog, digital, or some combination thereof.

Figure 2:
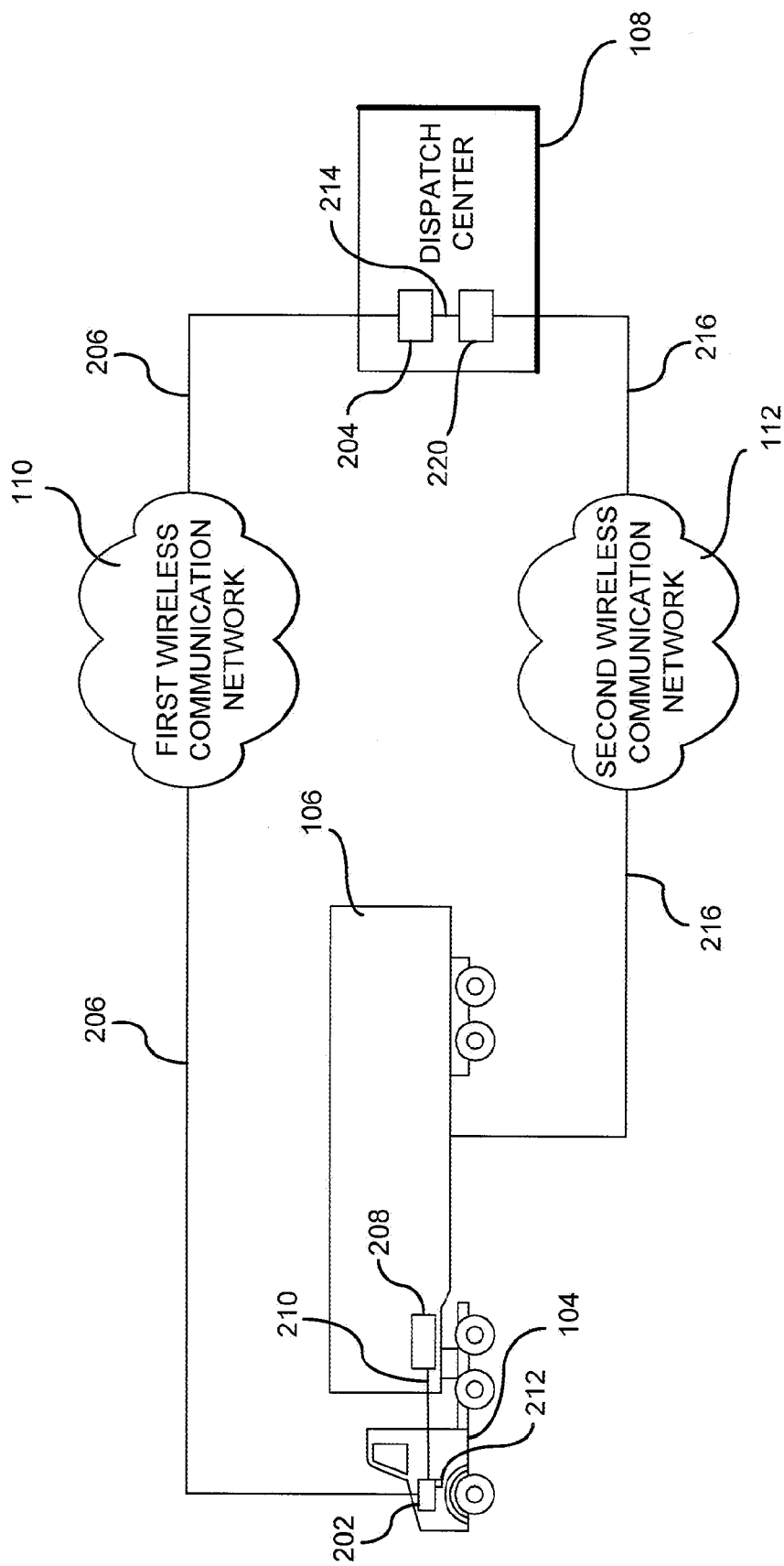
FIG. 2 is a block diagram of the system of FIG. 1 with additional detail.

Referring now to FIG. 2, truck cab 104 and truck trailer 106 are shown in more detail. Truck cab 104 typically has a first wireless communication device 202. First wireless communication device 202 is linked to a dispatcher device 204 in dispatcher center 108 via a communication link 206 through first wireless communication network 110. First wireless communication device 202 can be any number of wireless communication devices, such as, for example, the OMNIEXPRESS® described above, a push to talk radio (such as, for example, a CB radio or other two way radio), a cellular telephone, a processor with a user interface (such as a graphical user interface (GUI), keyboard, or the like), a portable digital assistant (PDA), or the like. First wireless communication device 202 includes a display indicator 212. Display indicator may be a light, flashing or steady, a text message box, a ring tone, a graphical representation on a GUI, or the like. Dispatch device 204 is adapted to receive signals from first communication network 110, and may be a wireless device similar to first wireless communication device 202, but may be other types of devices as known in the art as well.

Still referring to FIG. 2, truck trailer 106 may have a second wireless communication device 208. Generally, second wireless communication device 208 is a fleet tracking device. Fleet tracking devices provide dispatch center 108 or the NOC with information relating to, for example, the location of a particular fleet asset. One such product is the TRAILERTRACS® product from Qualcomm, Inc. Dispatch device 204 may be adapted to receive signals from second wireless communication device 208, but second wireless communication device may provide data to a processor 220 associated with dispatch center 108 or the NOC. Dispatch device 204 and processor 220 may be connected via a data link 214, which may be a wired or wireless data link. Alternatively, dispatch device 204 and processor 220 may be incorporated into a single unit. Second wireless communication device 208 provides information and data to dispatch center over communication path 216 through second wireless communication network 112. A data link 210 connects second wireless communication device 208 in truck trailer 106 with first wireless communication device 202 in truck cab 104. Data link 210 may be a wired or wireless connection.

Frequently, second wireless communication device 208 is in range of second wireless communication network 112 over more area than first wireless communication device 202 is in range of first wireless communication network 110. The larger area of coverage could be because second wireless communication device 208 uses both digital and analog signals, because second wireless communication device 208 is more powerful than first wireless communication device 202, because second wireless communication device 208 uses satellites, because second wireless communication device 208 has a better antenna structure (not shown) than first wireless communication device 202, or because of a combination thereof. Thus, second wireless communication device 208 is often in network even if first wireless communication device 202 is out of network.

Figure 3:
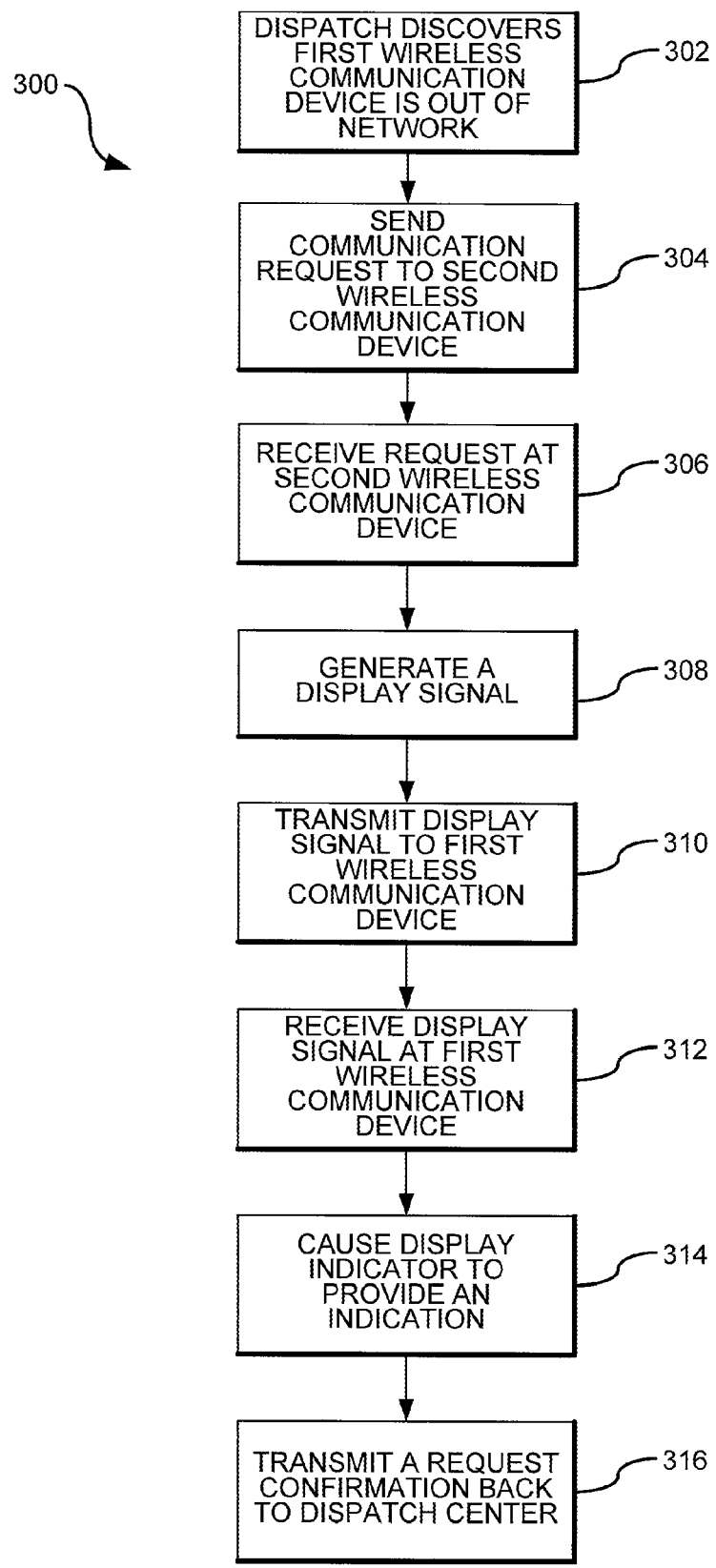
FIG. 3 is a flowchart showing a methodology associated with the system.

Referring now to FIG. 3, a flowchart 300 shows on possible method for to indicate to a driver in a truck cab that the dispatcher would like to communication with the driver. Each of the steps associated with flowchart 300 may be automated or manual. First, the dispatcher would discover first communication device 202 is out of network, step 302. This discovery could result from failed attempts at communication or a signal at the NOC that first communication device 202 is out of network. Next, the dispatcher would cause processor 220 to send a communication request signal to second communication device 208, step 304. Second wireless communication device 208 would receive the communication request signal, step 306, and generate a display signal, step 308. Second wireless communication device 208 would transmit the display signal to first communication device over data link 210, step 310. First communication device would receive the display signal, step 312, and cause the display indicator 212 to provide an indication to the driver that communication is waiting or wanted, step 314. Optionally, a communication request confirmation signal may be transmitted back to the dispatcher, step 316. If the communication request confirmation signal is generated, it could be generated by first wireless communication device 202, second wireless communication device 208, or the like, or a combination thereof. When display indicator indicates the driver has received a communication request signal, the driver knows to contact the dispatcher. If the user has re-entered first wireless communication network 110 coverage, the user could communicate using communication device 202. If the user has not re-entered first wireless communication network 110 coverage, the user would use a means other than first wireless communication device 202. Thus, the driver may pull of the road to a landline phone, use a personal cellular telephone currently in network, drive until an in network zone is found, etc.

Notice, the system and processes work in reverse as well. In other words, if the drive wished to contact the dispatch center when first communication device 202 was out of network, the driver could cause an indication to indicate at dispatch center 108 in a similar, but reversed, process. However, if the driver's unit is out of network it is assumed the driver would pull over to make a call rather than provide an indication to the dispatch center.

Moreover, assuming the bandwidth was available, the sent communication request signal may provide the actual communication data as well. In other words, first wireless communication device 202 and first wireless communication network 110 combined with second wireless communication device 208 and second wireless communication network 112 via the data link 210 could be configured to provide a blended communication structure where the communication would be sent over the most cost effective and/or available pathway. For example, if first wireless communication device 202 was out of network, the user would operate first wireless communication device 202 in a normal way, but instead of transmitting the communication signal over first wireless communication network 110, the device would transmit the communication signal over data link 210 to second wireless communication device 208, which would transmit the communication signal to the dispatcher 108 over second wireless communication network 112.

Figure 4:
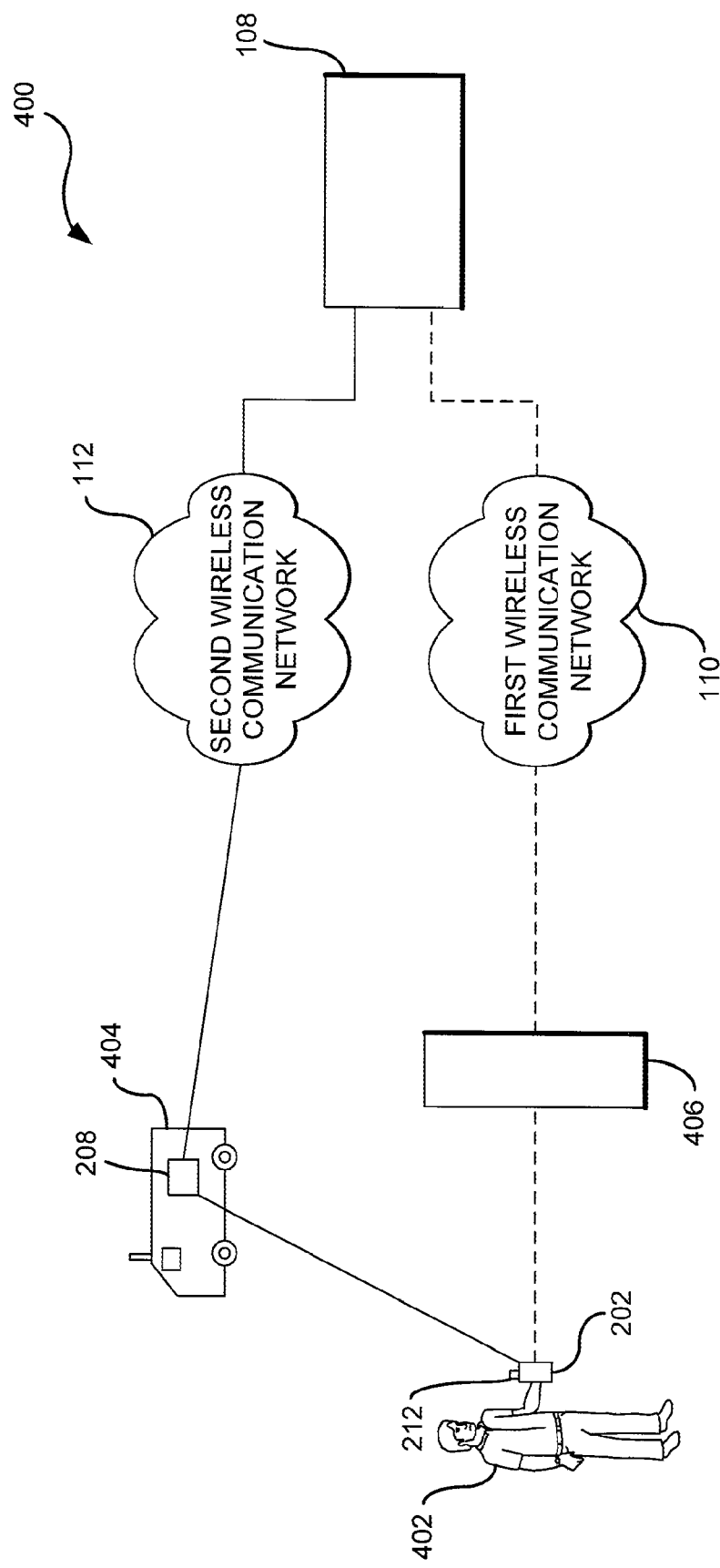
FIG. 4 is a block diagram of another system.

As mentioned above, vehicle 102 comprising a truck cab 104 and a truck trailer 106 is provided as a non-limiting example. Vehicle does not need to be a two part vehicle such as a semi-truck, but could be, for example, a taxi, a conventional car, a plane, a train, a boat, or the like. Moreover, the system described above would work for dispatching employees as well. For example, referring to FIG. 4, system 400 includes a first wireless communication device 202 and a second wireless communication device 208. A person 402 or user of first wireless communication device 202 carries it on a job site. If on the job site, person 402 leaves the wireless coverage area, the dispatcher can send a communication request signal to cause display indicator 212 to provide indication. Because person 402, such as a repairman, field worker, or the like, leaves vehicle 404 to perform the required work, first wireless communication network 110 and second wireless communication network 112 may be the same in this instance as the out of network is more likely caused by local interference 406 than actually being out of the coverage area.

I claim:

1. A wireless communication apparatus configured to alert a user of a vehicle when out of network that a communication is desired, the wireless communication apparatus comprising:
   a first wireless communication device located in a cab portion of a vehicle and available to a user of the vehicle, wherein the first wireless communication device comprises a display indicator and is configured to:
   couple to a dispatch center via a first wireless communication network;
   couple, via a wired data link, to a second wireless communication device located in a trailer portion of the vehicle, wherein the second wireless communication device has a larger communication coverage area than that of the first wireless communication device, comprises a satellite communication device, is coupled to a second wireless communication network, and is configured to facilitate two-way data communication with the dispatch center;
   receive, over the wired data link, a display signal generated by the second wireless communication device in response to a receipt of a communication request signal comprising actual communication data originating from the dispatch center when the first wireless communication device loses a connection with the dispatch center over the first wireless communication network, wherein the display signal is configured to cause the display indicator to indicate an alert; and
   supply a communication request confirmation signal to the dispatch center to confirm the communication request signal was received.

2. The apparatus of claim 1, wherein the display indicator is selected from the group of indicators consisting of a light, a vibration, a text display, and a ring tone.

3. A method for alerting a user of a first wireless communication device located in a vehicle that a dispatch center wishes to communicate with the user, the method comprising:
   receiving, by a first wireless communication device over a wired data link with a second wireless communication device, a display signal generated by the second wireless communication device in response to a receipt of a communication request signal comprising actual communication data originating from the dispatch center when the first wireless communication device loses a connection with the dispatch center over a first wireless communication network, wherein the first wireless communication device is located in a cab portion of the vehicle and available to a user in the vehicle, the second wireless communication device is located in a trailer portion of the vehicle and comprises a satellite communication device, the second wireless communication device having a larger communication coverage area than that of the first wireless communication device, and the dispatch center and the second wireless communication device are in two-way data communication over a second wireless communication network; and
   causing a display indicator on the first wireless communication device to indicate an alert based on the display signal, wherein the alert is configured to alert the user that the dispatch center wishes to communicate.

4. The apparatus of claim 1, wherein the communication request signal comprises actual communication data originating from the dispatch center.

5. A wireless communication apparatus configured to alert a user of a vehicle when out of network that a communication is desired, the wireless communication apparatus comprising:
   a second wireless communication device located in a trailer portion of a vehicle and comprising a satellite communication device, wherein the second wireless communication device is configured to:
   couple to a second wireless communication network for facilitating two-way data communication with a dispatch center;
   couple, via a wired data link, to a first wireless communication device, wherein the first wireless communication device is located in a cab portion of the vehicle and is available to a user of the vehicle, comprises a display indicator, and is configured to couple to the dispatch center via a first wireless communication network, wherein the second wireless communication device has a larger communication coverage area than that of the first wireless communication device;
   generate and transmit a display signal to the first wireless communication device over the wired data link in response to a receipt of a communication request signal comprising actual communication data originating from the dispatch center when the first wireless communication device loses a connection with the dispatch center over the first wireless communication network, wherein the display signal is configured to cause the display indicator to indicate an alert; and
   supply a communication request confirmation signal to the dispatch center to confirm the communication request signal was received.

6. A method for alerting a user of a first wireless communication device located in a vehicle that a dispatcher wishes to communicate with the user, the method comprising:
   receiving, at a second wireless communication device, a communication request comprising actual communication data sent by a dispatch center when the first wireless communication device loses a connection with the dispatch center over a first wireless communication network, wherein the second wireless communication device is located in a trailer portion of the vehicle and comprises a satellite communication device, the second wireless communication device has a larger communication coverage area than that of the first wireless communication device, and is in two-way data communication with the dispatch center over a second wireless communication network;
   generating a display signal at the second wireless communication device in response to the communication request, wherein the display signal is configured to cause a display indicator on the first wireless communication device to indicate an alert for alerting the user that the dispatcher wishes to communicate; and
   transmitting the display signal from the second wireless communication device to the first wireless communication device over a wired data link coupling the first wireless communication device to the second wireless communication device, wherein the first wireless communication device is located in a cab portion of the vehicle and available to the user in the vehicle.

7. The method of claim 6, further comprising supplying a communication request confirmation signal to the dispatch center to confirm the communication request signal was received by the second wireless communication device.

8. A wireless communication apparatus configured to alert a user of a vehicle when out of network that a communication is desired, the wireless communication apparatus comprising:
a dispatch center configured to:
couple to a first wireless communication device via a first wireless communication network, wherein the first wireless communication device is located in a cab portion of the vehicle and is available to the user of the vehicle, and comprises a display indicator;
couple to a second wireless communication device via a second wireless communication network to facilitate two-way data communication with the second wireless communication device, wherein the second wireless communication device is located in a trailer portion of the vehicle, comprises a satellite communication device, and is coupled via a wired data link to the first wireless communication device, the second wireless communication device having a larger communication coverage area than that of the first wireless communication device; and
transmit to the second wireless communication device a communication request signal comprising actual communication data originating from the dispatch center when the first wireless communication device loses a connection with the dispatch center over the first wireless communication network, wherein the communication request signal is configured to cause the second wireless communication device to generate and transmit a display signal to the first wireless communication device over the wired data link, wherein the display signal is configured to cause the display indicator to indicate an alert.

9. The apparatus of claim 8, wherein the dispatch center is further configured to receive a communication request confirmation signal from the second wireless communication device to confirm the communication request signal was received.

10. A method for alerting a user of a first wireless communication device located in a vehicle that a dispatcher wishes to communicate with the user, the method comprising:
entering into, by a dispatch center, a two-way data communication with a second wireless communication device over a second wireless communication network, wherein the second wireless communication device is located in a trailer portion of the vehicle, comprises a satellite communication device, and has a larger communication coverage area than that of the first wireless communication device;
sending a communication request comprising actual communication data originating from the dispatch center to the second wireless communication device when the first wireless communication device loses a connection with the dispatch center over a first wireless communication network, wherein the communication request is configured to cause a display signal to be generated at the second wireless communication device in response to the communication request and to be transmitted to the first wireless communication device from the second wireless communication device over a wired data link coupling the first wireless communication device to the second wireless communication device, wherein the first wireless communication device is located in a cab portion of the vehicle and available to the user in the vehicle, and wherein the display signal is configured to cause a display indicator on the first wireless communication device to indicate an alert for alerting the user that the dispatch center wishes to communicate.

11. The method of claim 10, further comprising receiving a communication request confirmation signal by the dispatch center from the second wireless communication device to confirm the communication request signal was received.

12. An apparatus for alerting a user of a first wireless communication device located in a vehicle that a dispatcher wishes to communicate with the user, the apparatus comprising:
means for receiving, at the first wireless communication device over a wired data link with a second wireless communication device, a display signal generated by the second wireless communication device in response to a communication request comprising actual communication data originating from a dispatch center to the second wireless communication device when the first wireless communication device loses a connection with the dispatch center over a first wireless communication network, wherein the first wireless communication device is located in a cab portion of the vehicle and available to the user in the vehicle, the second wireless communication device is located in a trailer portion of the vehicle and comprises a satellite communication device, the second wireless communication device having a larger communication coverage area than that of the first wireless communication device, and the dispatch center and the second wireless communication device are in two-way data communication over a second wireless communication network; and
means for causing a display indicator on the first wireless communication device to indicate an alert based on the display signal for alerting the user that the dispatcher wishes to communicate.

13. The apparatus of claim 12, wherein the means for causing the display indicator to indicate includes means for causing the display indicator to at least one of illuminate, vibrate, ring, or display a text message.

14. A non-transitory storage medium comprising program instructions which are computer-executable to implement alerting a user of a first wireless communication device located in a vehicle that a dispatcher wishes to communicate with the user, and which when executed perform:
receiving, at the first wireless communication device over a wired data link with a second wireless communication device, a display signal generated by the second wireless communication device in response to a communication request comprising actual communication data originating from a dispatch center to the second wireless communication device when the first wireless communication device loses a connection with the dispatch center over a first wireless communication network, wherein the first wireless communication device is located in a cab portion of the vehicle and available to the user in the vehicle, the second wireless communication device is located in a trailer portion of the vehicle and comprises a satellite communication device, the second wireless communication device having a larger communication coverage area than that of the first wireless communication device, and the dispatch center and the second wireless communication device are in two-way data communication over a second wireless communication network; and causing a display indicator on the first wireless communication device to indicate an alert based on the display signal for alerting the user that the dispatcher wishes to communicate.

15. The non-transitory storage medium of claim 14, wherein causing the display indicator to indicate includes causing the display indicator to at least one of illuminate, vibrate, ring, or display a text message.

16. An apparatus for alerting a user of a first wireless communication device located in a vehicle that a dispatcher wishes to communicate with the user, comprising:
   means for receiving, at a second wireless communication device, a communication request comprising actual communication data originating from a dispatch center when the first wireless communication device loses a connection with the dispatch center over a first wireless communication network, wherein the second wireless communication device is located in a trailer portion of the vehicle and comprises a satellite communication device, the second wireless communication device having a larger communication coverage area than that of the first wireless communication device, and the dispatch center and the second wireless communication device are in two-way data communication over a second wireless communication network;
   means for generating a display signal at the second wireless communication device in response to the communication request, wherein the display signal is configured to cause a display indicator on the first wireless communication device to indicate an alert for alerting the user that the dispatcher wishes to communicate; and
   means for transmitting the display signal from the second wireless communication device to the first wireless communication device over a wired data link coupling the first wireless communication device to the second wireless communication device, wherein the first wireless communication device is located in a cab portion of the vehicle and available to the user in the vehicle.

17. A non-transitory storage medium comprising program instructions which are computer-executable to implement alerting a user of a first wireless communication device located in a vehicle that a dispatcher wishes to communicate with the user, and which when executed perform:
   receiving, at a second wireless communication device, a communication request comprising actual communication data originating from a dispatch center when the first wireless communication device loses a connection with the dispatch center over a first wireless communication network, wherein the second wireless communication device is located in a trailer portion of the vehicle and comprises a satellite communication device, the second wireless communication device having a larger communication coverage area than that of the first wireless communication device, and the dispatch center and the second wireless communication device are in two-way data communication over a second wireless communication network;
   generating a display signal at the second wireless communication device in response to the communication request, wherein the display signal is configured to cause a display indicator on the first wireless communication device to indicate an alert for alerting the user that the dispatcher wishes to communicate; and
   transmitting the display signal from the second wireless communication device to the first wireless communication device over a wired data link coupling the first wireless communication device to the second wireless communication device, wherein the first wireless communication device is located in a cab portion of the vehicle and available to the user in the vehicle.

18. An apparatus for alerting a user of a first wireless communication device located in a vehicle that a dispatcher wishes to communicate with the user, the apparatus comprising:
   means for entering into, by a dispatch center, a two-way data communication with a second wireless communication device over a second wireless communication network, wherein the second wireless communication device is located in a trailer portion of the vehicle and comprises a satellite communication device, the second wireless communication device having a larger communication coverage area than that of the first wireless communication device;
   means for sending a communication request comprising actual communication data originating from the dispatch center to the second wireless communication device when the first wireless communication device loses a connection with the dispatch center over a first wireless communication network, wherein the communication request is configured to cause a display signal to be generated at the second wireless communication device in response to the communication request and to be transmitted to the first wireless communication device from the second wireless communication device over a wired data link coupling the first wireless communication device to the second wireless communication device, wherein the first wireless communication device is located in a cab portion of the vehicle and available to the user in the vehicle, and wherein the display signal is configured to cause a display indicator on the first wireless communication device to indicate an alert for alerting the user that the dispatch center wishes to communicate.

19. The apparatus of claim 18, further comprising means for receiving a communication request confirmation signal by the dispatch center from the second wireless communication device to confirm the communication request signal was received.

20. A non-transitory storage medium comprising program instructions which are computer-executable to implement alerting a user of a first wireless communication device located in a vehicle that a dispatcher wishes to communicate with the user, and which when executed perform:
   entering into, by a dispatch center, a two-way data communication with a second wireless communication device over a second wireless communication network, wherein the second wireless communication device is located in a trailer portion of the vehicle and comprises a satellite communication device, the second wireless communication device having a larger communication coverage area than that of the first wireless communication device;
   sending a communication request comprising actual communication data originating from the dispatch center to the second wireless communication device when the first wireless communication device loses a connection with the dispatch center over a first wireless communication network, wherein the communication request is configured to cause a display signal to be generated at the second wireless communication device in response to the communication request and to be transmitted to the first wireless communication device from the second wireless communication device over a wired data link coupling the first wireless communication device to the second wireless communication device, wherein the first wireless communication device is located in a cab portion of the vehicle and available to the user in the vehicle, and wherein the display signal is configured to cause a display indicator on the first wireless communication device to indicate an alert for alerting the user that the dispatch center wishes to communicate.

21. The non-transitory storage medium of claim 20, further comprising receiving a communication request confirmation signal by the dispatch center from the second wireless communication device to confirm the communication request signal was received.

\* \* \* \* \*